US012579281B2

(12) United States Patent
Shaieb et al.

(10) Patent No.: US 12,579,281 B2
(45) Date of Patent: Mar. 17, 2026

(54) DYNAMIC PRIORITIZATION OF VULNERABILITY RISK ASSESSMENT FINDINGS

(71) Applicant: International Business Machines Corporation, Armonk, NY (US)

(72) Inventors: Johnny Al Shaieb, Cypress, TX (US); Steven Ocepek, Cuyahoga Falls, OH (US); Jason A. Nikolai, Rochester, MN (US); Melody Leu, Denver, CO (US); Andrew C. Herlands, New York, NY (US); Michael Redford, Wentzville, MO (US); Elio Andres Sanabria Echeverria, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 18/536,521

(22) Filed: Dec. 12, 2023

(65) Prior Publication Data

US 2025/0190579 A1 Jun. 12, 2025

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01)

(58) Field of Classification Search
CPC ................ G06F 21/577; G06F 21/552; G06F 2221/034; G06F 21/554; H04L 63/1441; H04L 63/1408; H04L 63/1433
See application file for complete search history.

(56) References Cited

U.S. PATENT DOCUMENTS 8,504,405 B2    8/2013    Miller et al.
9,811,790 B2    11/2017    Ahern et al.
(Continued)

FOREIGN PATENT DOCUMENTS

CN        112464252 A        3/2021
CN        114780965 A        7/2022

OTHER PUBLICATIONS

"Appraisals", ISACA, CMMI Institute—CMMI Levels of Capability and Performance, accessed online Nov. 16, 2023, 4 pages.
(Continued)

*Primary Examiner* — Wasika Nipa
*Assistant Examiner* — Edgar W Xie
(74) *Attorney, Agent, or Firm* — Cantor Colburn LLP; Anthony Mauricio Pallone

(57) ABSTRACT

Mechanisms are provided for assessing control checks and components of a vulnerability management system (VMS) for a computing infrastructure. A security vulnerability risk gap assessment of the VMS is executed to generate result data for a plurality of control checks. For each control check, the mechanisms: classify the control check into a maturity level having a corresponding maturity level value; classify each of a plurality of vulnerability assessment security control rating (VASCR) elements into a predetermined classification having corresponding classification values for the control check; and combine the maturity level value and the VASCR element classification values to generate a prioritization score. A graphical user interface output is generated comprising a representation of a prioritized ranked listing of control checks based on the prioritization scores associated with each of the control checks in the plurality of control checks.

19 Claims, 4 Drawing Sheets

(56) References Cited

U.S. PATENT DOCUMENTS

| | | | |
|---|---|---|---|
| 10,417,712 | B2 | 9/2019 | Buccetti et al. |
| 11,392,445 | B2 | 7/2022 | Balasubramanian et al. |
| 11,438,362 | B2 * | 9/2022 | Aleidan ............. H04L 63/1433 |
| 11,477,231 | B2 | 10/2022 | Bubshait et al. |
| 11,768,945 | B2 | 9/2023 | Chiarelli et al. |
| 2018/0018602 | A1 | 1/2018 | DiMaggio et al. |
| 2020/0356678 | A1 * | 11/2020 | Gourisetti ............. G06F 21/577 |
| 2021/0273968 | A1 | 9/2021 | Shaieb et al. |
| 2022/0038486 | A1 * | 2/2022 | Baragaba ............. H04L 63/083 |
| 2022/0286474 | A1 | 9/2022 | Kuppa et al. |
| 2023/0098977 | A1 * | 3/2023 | Conde-Berrocal .......................... G06F 21/6254 705/7.28 |

OTHER PUBLICATIONS

Herndon, Mary A. et al., "Interpreting Capability Maturity Model® Integration (CMMI® ) for Service Organizations—a Systems Engineering and Integration Services Example", Software Engineering Institute (SEI), Software Engineering Process Management, Technical Note CMU/SEI-2003-TN-005, Nov. 2003, 49 pages.

* cited by examiner

| DOMAIN | CONTROL BUILDING BLOCK | ID | CMMI SCORE (1 – 5) |
|---|---|---|---|
| CAPABILITY | VULNERABILITY MANAGEMENT | CA-VM | 2.0 |
| CAPABILITY | ASSET MANAGEMENT PLATFORM | CA-AM | 2.0 |
| CAPABILITY | DEVICE COVERAGE | CA-DC | 2.0 |
| CAPABILITY | PATCH MANAGEMENT PROGRAM | CA-PM | 2.0 |
| CAPABILITY | PENETRATION TESTING | CA-PT | 2.0 |
| CAPABILITY | POLICY COMPLIANCE & SECURITY CONFIGURATION ASSESSMENT | CA-PC | 1.0 |
| CAPABILITY | CHANGE MANAGEMENT PLATFORM | CA-CM | 3.0 |
| CAPABILITY | VULNERABILITY MANAGEMENT | CA-SI | 2.0 |

*FIG. 1*

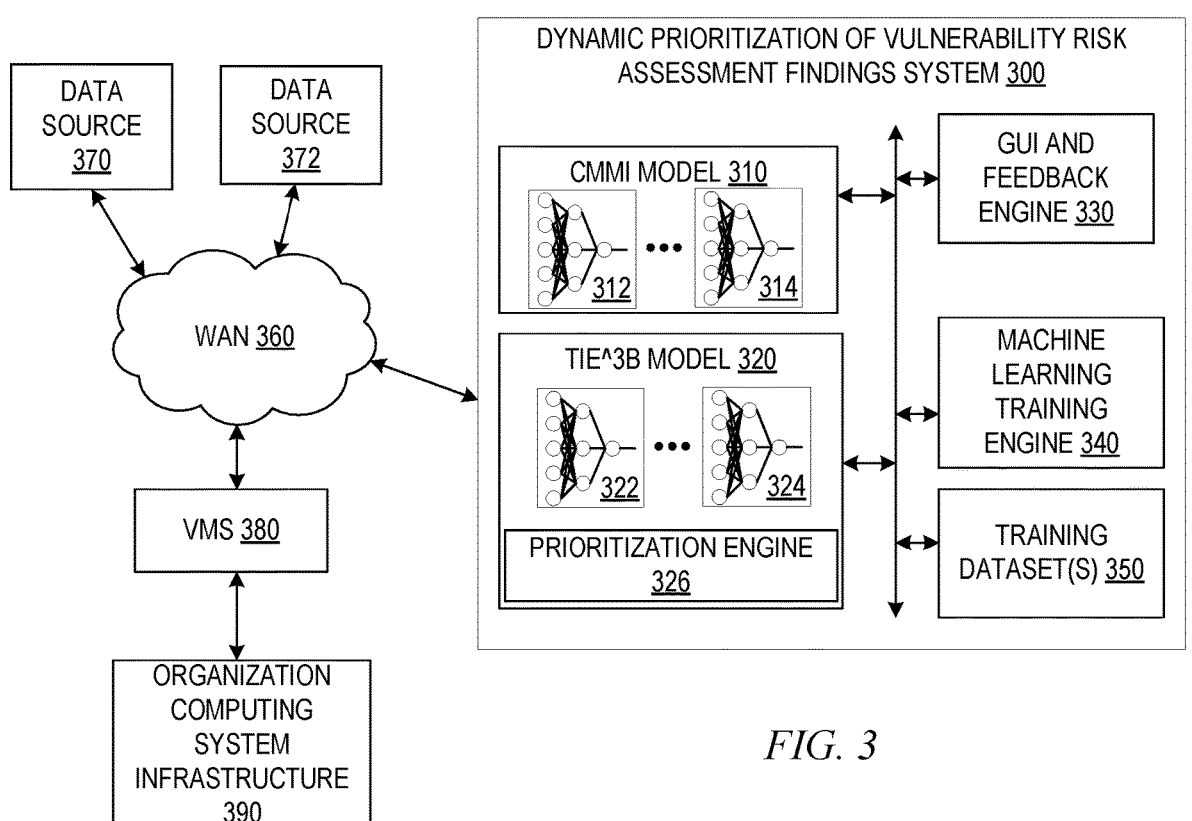

*FIG. 3*

| DOMAIN 410 | CONTROL BUILDING BLOCK 415 | ID 420 | TIEBREAK 425 | TIEBREAK +CMMI 430 | CMMI SCORE 435 | TIME (5-1) 440 | IMPACT (1-5) 445 | EFFORT (5-1) 450 | EXPENSE (5-1) 455 | EXPLOIT. (1-5) 460 | BUILDING BLOCK (5-1) 470 |
|---|---|---|---|---|---|---|---|---|---|---|---|
| CAPABILITY | VULNERABILITY MANAGEMENT | CA-VM | 2500 | 10000 | 2.0 | 5.0 | 5.0 | 4.0 | 1.0 | 5.0 | 5.0 |
| CAPABILITY | ASSET MANAGEMENT PLATFORM | CA-AM | 1200 | 4800 | 2.0 | 3.0 | 4.0 | 4.0 | 1.0 | 5.0 | 5.0 |
| CAPABILITY | DEVICE COVERAGE | CA-DC | 1125 | 4500 | 2.0 | 3.0 | 5.0 | 3.0 | 1.0 | 5.0 | 5.0 |
| CAPABILITY | PATCH MANAGEMENT PROGRAM | CA-PM | 1000 | 4000 | 2.0 | 4.0 | 5.0 | 2.0 | 1.0 | 5.0 | 5.0 |
| CAPABILITY | PENETRATION TESTING | CA-PT | 960 | 3840 | 2.0 | 5.0 | 4.0 | 2.0 | 2.0 | 4.0 | 3.0 |
| CAPABILITY | POLICY COMPLIANCE & SECURITY CONFIGURATION ASSESSMENT | CA-PC | 324 | 1620 | 1.0 | 3.0 | 3.0 | 2.0 | 2.0 | 3.0 | 3.0 |
| CAPABILITY | CHANGE MANAGEMENT PLATFORM | CA-CM | 450 | 1350 | 3.0 | 2.0 | 5.0 | 3.0 | 1.0 | 3.0 | 5.0 |
| CAPABILITY | VULNERABILITY MANAGEMENT | CA-SI | 324 | 1296 | 2.0 | 3.0 | 4.0 | 3.0 | 1.0 | 3.0 | 5.0 |

*FIG. 4*

DYNAMIC PRIORITIZATION OF VULNERABILITY RISK ASSESSMENT FINDINGS

BACKGROUND

The present application relates generally to an improved data processing apparatus and method and more specifically to an improved computing tool and improved computing tool operations/functionality for dynamic prioritization of vulnerability risk assessment findings.

With the cost of a data breach reaching an all-time high of many millions of dollars, organizations need to understand where their vulnerabilities lie. It only takes one opportunity for a hacker to breach an organization's computing environment. IBM X-Force Red is a service that uses the same tactics, tools, techniques and mindsets as attackers to uncover and assist organizations in fixing their vulnerabilities. IBM X-Force Red uses a team of hundreds of human hackers to break into organizations and uncover risky vulnerabilities that attackers may use for personal gain. The team's offensive security services, which include penetration testing, vulnerability management, and adversary simulation, can help identify and remediate security flaws covering an organization's entire digital and physical ecosystem. IBM X-Force Red can advise organizations as to where their vulnerability management is lacking.

Vulnerability management is the ongoing, regular process of identifying, classifying, and handling vulnerabilities in a digital and/or physical ecosystems. An organization's Vulnerability Management Systems (VMS) is a software application or platform that helps the organization identify, assess, prioritize, and remediate vulnerabilities in their networks, systems, applications, and software. It is a continuous proactive, and often automated process that keeps computer systems, networks, and enterprise applications safe from cyberattacks and data breaches. The vulnerability management process typically includes a number of components including asset discovery and inventory, vulnerability scanners, patch management, and configuration management. For example, vulnerability management may operate to identify vulnerabilities due to software patches not being properly installed, upgrades to key software components not having been made in the software environment, as well as performing vulnerability scans for identifying malware, viruses, and other sources of cyber threats. Many different tests, e.g., application tests, network tests, hardware tests, and the like, as well as various types of analyses may be involved in identifying the various vulnerabilities.

Capability Maturity Model Integration (CMMI)® is a process level improvement training and appraisal program administered by the CMMI Institute, which is a subsidiary of Information Systems Audit and Control Association (ISACA). CMMI® provides a set of global best practices with regard to improving performance and aligning operations with organization goals, and provides a model to allow organizations to understand their current level of capability and performance as well as offer a guide to optimizations. CMMI® is required by many government and non-government organizations, especially in the area of software development. The CMMI® model has 5 levels of maturity:

Level 1 (Initial)—processes are unpredictable, poorly controlled, and reactive;
Level 2 (Managed)—processes characterized for projects and are often reactive;
Level 3 (Defined)—processes characterized for the organization and are proactive;

Level 4 (Quantitatively Managed)—processes measured and controlled; and
Level 5 (Optimizing)—focus on process improvement The lower the level, the less mature the corresponding process is, and thus may be a focus of improvement. The CMMI may be used to evaluate various processes of a computing environment, such evaluating various processes and components of the computing environment using a VMS.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for assessing control checks and components of a vulnerability management system for a computing system infrastructure. The mechanisms execute a security vulnerability risk gap assessment of the vulnerability management system (VMS) to generate result data for a plurality of control checks applied during the security vulnerability risk gap assessment. For each control check in the plurality of control checks, the mechanisms: classify the control check into one of a plurality of predetermined maturity levels having corresponding maturity level values to generate a maturity level value for the control check; classify each of a plurality of vulnerability assessment security control rating (VASCR) elements into one of a plurality of predetermined classifications having corresponding classification values, to thereby generate VASCR element classification values for the control check; and combine the maturity level value and the VASCR element classification values to generate a prioritization score. The mechanisms generate a graphical user interface output comprising a representation of a prioritized ranked listing of control checks based on the prioritization scores associated with each of the control checks in the plurality of control checks.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the corresponding drawings, wherein:

FIG. 1 is an example diagram illustrating multiple components of a VMS having the same or tied CMMI score;

FIG. 3 is an example block diagram illustrating the primary operational components of a dynamic prioritization of vulnerability risk assessment findings system in accordance with one illustrative embodiment;

FIG. 4 is an example diagram illustrating the evaluation of the various vulnerability assessment security control rating (VASCR) elements and the generation of the TIE BREAK based priority scoring of control checks/components in accordance with one illustrative embodiment.

DETAILED DESCRIPTION

Figure 2:
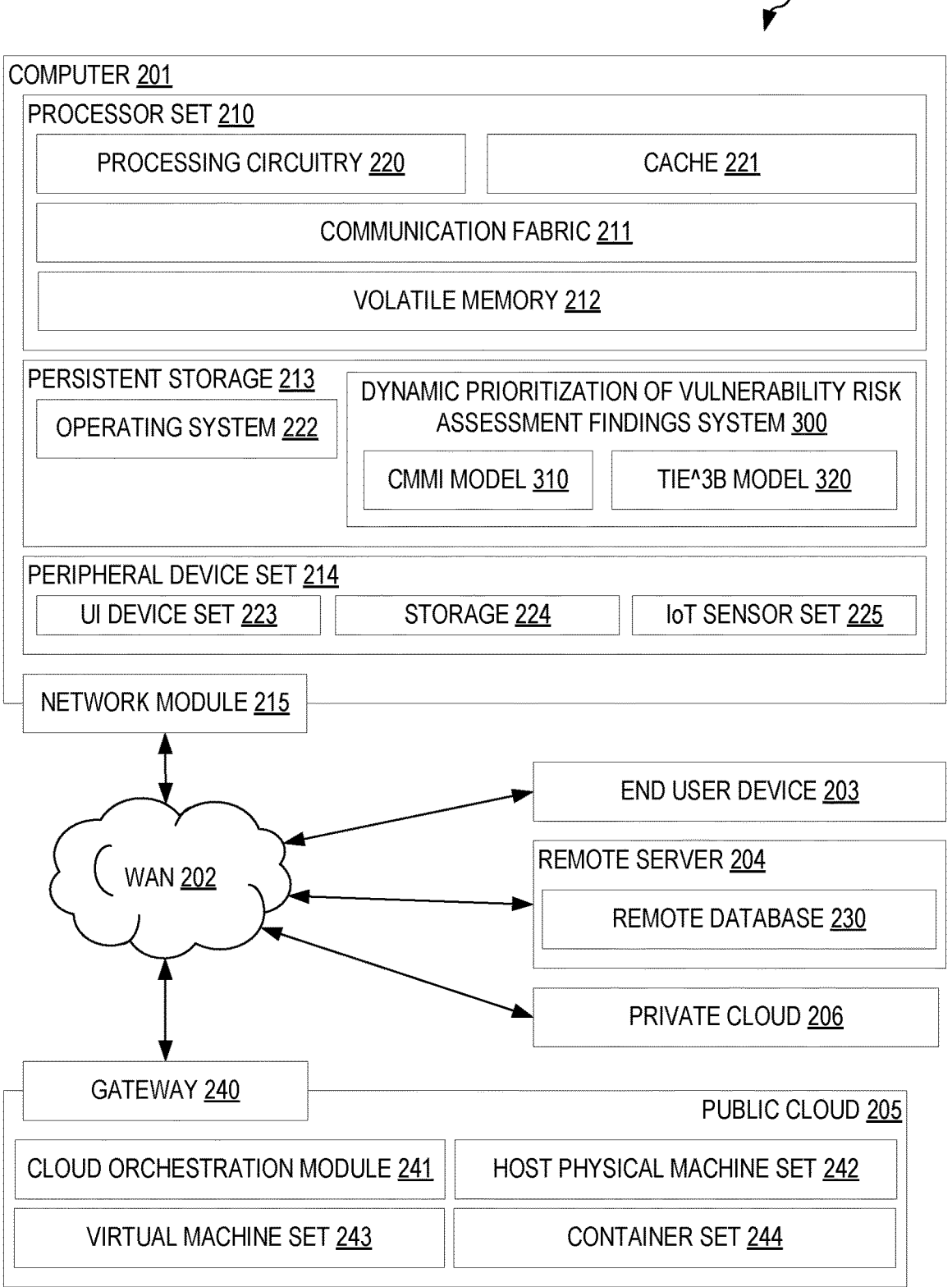
FIG. 2 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for dynamic prioritization of vulnerability risk assessment findings. The illustrative embodiments provide mechanisms for generating maturity roadmaps and sequential project plans by dynamically prioritizing vulnerabilities that may have matching or tied initial maturity ratings for control checks. The illustrative embodiments provide an improved computer tool and improved computing tool operations/functionality that determines the sequential ordering of security controls findings with regard to optimizing an organization's vulnerability management system to protect the organization's cyber footprint. The improved computing tool operations/functionality can be customized to fit the particular organization's environment, culture, resources, and security ecosystem. By providing a more fine-grained assessment along multiple additional dimensions of maturity, which takes into consideration the specific organization's environment, culture, resources, and security ecosystem with regard to these control checks, organization resources may be directed to the most important gaps in the organization's Vulnerability Management System (VMS) used to assess, identify, and remediate vulnerabilities in the organization's computing infrastructure.

As noted above, an organization's VMS may utilize the Capability Maturity Model Integration (CMMI)® model as a basis for evaluating and scoring control checks extracted from various industry standards, such as, but not limited to, National Institute of Standards and Technology (NIST) 800-53, International Organization for Standardization (ISO) 27001, Federal Financial Institutions Examination Council (FFIEC), and International Society of Automation/International Electrotechnical Commission (ISA/IEC) 62443. An organization's control checks are a set of guidelines and best practices provided by industry recognized institutions, e.g., NIST, FFIEC, and the like, which may be implemented as computer executed logic, e.g., rules, algorithms, or the like, to evaluate an organization's VMS, such as when performing security risk gap assessment to identify cyber security vulnerabilities.

Security risk gap assessments utilize these control checks to assess all or part of an organization's VMS and may utilize the CMMI model to score these different parts of the VMS using the 5 levels of maturity defined in the CMMI model. A security risk gap assessment may involve hundreds of control checks, with each being scored according to the CMMI model and given a score of 1, 2, 3, 4, or 5. The scoring of the control checks may be used to score the corresponding component, or part, of the organization's VMS, e.g., vulnerability management, asset management platform, device coverage, patch management program, penetration testing, policy compliance and security configuration assessment, change management platform, SIEM intelligence, etc., also sometimes referred to as control building blocks. These control checks, scored with the CMMI model, with the 5 levels of maturity previously discussed above, may be used to create a maturity roadmap utilizing project plans to assist organizations in evolving their VMS, such as by sequentially prioritizing, in ascending CMMI score, the components of the VMS to provide recommendations for security gap remediation.

Control checks that have been scored with CMMI are used to create recommendations and action plans to help organizations mature their VMS. However, depending on the determined maturity of the VMS, many control checks and corresponding components of the VMS may receive the same CMMI score. For example, FIG. 1 shows the results of a security risk gap assessment in which various components of an organization's VMS are scored according to the CMMI model. The diagram of FIG. 1 shows the scoring of various components, or control building blocks, of an organization's VMS as may be determined from applying control checks and generating corresponding CMMI scores. The result in this example, has 6 CMMI assessments having the same, or tied, score of "2.0" for the corresponding components.

As can be seen from FIG. 1, the CMMI score does not provide an adequate prioritization of the components with the tied CMMI scores. Thus, it is difficult to prioritize gap assessment finding results in a sequential order to receive future maturity improvements. That is, the organization is not informed as to which of the tied components should be the focus of maturity improvements prior to others of the tied components, e.g., should vulnerability management be focused on first, prior to asset management platform or patch management program, or should one of the other components with a "2.0" CMMI score be prioritized first? Thus, while the CMMI scoring may give some information as to which components may need to receive maturity improvements with regard to differing CMMI scores, the CMMI scoring provides no information as to prioritization between components having the same or tied CMMI scores.

The improved computing tool and improved computing tool operations/functionality for dynamic prioritization of vulnerability risk assessment findings, e.g., security risk gap assessment findings, in which a prioritization scoring system is provided to assess components of a VMS along a plurality of additional dimensions, e.g., time, impact, effort, expense, exploitability, and building block weight, in addition to the CMMI. This scoring system may be applied to all CMMI scored components regardless of whether the CMMI scores are the same (tied) or not, but is especially well suited for "breaking ties" with regard to components having the same CMMI scores. Thus, the scoring system may be referred to herein as the Tie Breaker model, or $TIE^3B$, where T refers to Time, I refers to Impact, $E^3$ refers to Effort, Expense, and Exploitability, and B refers to Building Block weight. Each of these dimensions may be scored in a similar fashion to that of the CMMI scoring, e.g., on a scale of 1 to 5. These dimensions are referred to herein as vulnerability assessment security control rating (VASCR) elements. The TIE^3B model operates to evaluate these VASCR elements along with the CMMI model scoring, to generate a prioritization of VMS components for focusing maturity improvements which improve the VMS. The resulting prioritization may be used to drive a graphical user interface output of the prioritized listing of VMS components for maturity improvements, drive automated implementation of remediation actions with regard to the VMS, or the like.

In the case of a GUI output of the prioritization generated by the TIE^3B model, the GUI may provide user feedback elements whereby a user may provide feedback as to the correctness or incorrectness of the prioritization generated by the TIE^3B model. For example, the GUI output may be presented in a manner that the user can input a modification to the prioritization to rearrange the priority of the components of the VMS. The user input may be provided as feedback to the TIE^3B model which may then adjust its operational parameters to make improved prioritizations in future assessments. For example, these operational parameters may involve weights associated with VASCR elements, weights associated with nodes within machine learning computer models used to generate the scores associated with the various VASCR elements, hyperparameters, or the like.

For example, the TIE^3B model may comprise one or more machine learning computer models that are trained, through machine learning training operations involving training data and ground truth data, to evaluate each of the VASCR elements and generate corresponding scores for these VASCR elements. These assessments of the VASCR elements may involve extracting features from raw data received from the VMS or the computing infrastructure managed by the VMS, which are pertinent to the particular machine learning model prediction/classification. The machine learning training of the machine learning computer model(s) may involve multiple iterations of inputting features and generating corresponding classifications/predictions which are then compared to the ground truth data to determine if the machine learning computer model generated a correct result and if not, what the error or loss was between the generated classification/prediction and the correct classification/prediction. This error or loss is then used by a machine learning training algorithm, e.g., linear regression, ridge regression, Lasso regression, logistic regression, or other machine learning training algorithm, to generate modifications to operational parameters, such as weights of nodes within the machine learning computer model, so as to reduce the error or loss in the next iteration of the training. This process continues until a maximum number of iterations, or epochs, is reached or the error/loss is reduced to an acceptable level, such as may be specified by a threshold value on the error/loss. Similar to this error/loss during training of the machine learning computer models, the user feedback may be provided as a type of dynamic or runtime error/loss, which may be used to adjust the operational parameters of the corresponding machine learning computer model(s).

It should be noted that while the CMMI model scoring is used as an example herein, and the corresponding scoring of the various VASCR elements are based on a similar scale of scores to that of the CMMI model scoring, the illustrative embodiments are not limited to such. Rather, any current or later developed model for scoring components of a VMS may be used without departing from the spirit and scope of the present invention. The scale of VASCR element scorings may be adjusted accordingly to match that of the particular model used to score the components of the VMS. Moreover, while the illustrative embodiments will be described with reference to specifically the TIE^3B model VASCR elements, e.g., time, impact, effort, expense, exploitability, and building block weight, the illustrative embodiments are not limited to such. To the contrary, any other suitable elements for fine grained scoring of the components of a VMS may be used, in addition to, or in replacement of, these specific VASCR elements without departing from the spirit and scope of the illustrative embodiments.

Assuming the TIE^3B model implementation based on the CMMI model scoring scale, the dynamic prioritization of vulnerability risk assessment findings performed by the TIE^3B model comprise assessments of the VASCR elements of (1) Time, (2) Impact, (3) Effort, (4) Expense, (5) Exploitability, and (6) Building Block weight, which are combined with the (7) CMMI score. In accordance with one or more illustrative embodiments, each of these 7 elements are scored on a 1 to 5 value scale. The combination of the scoring of these VASCR elements and the CMMI score may be used to quickly determine and sequentially order which security control checks should be targeted to optimize an organization's vulnerability management system.

The Tie Break (TIE^3B) model is a product of these VASCR elements as discussed hereafter, where each VASCR element can be customized to fit within the organization's culture, resources, and security ecosystem. That is, each building block control check has its own unique, or customized, combination of VASCR element selections based on previous recorded findings to implement a maturity correction, and each VASR element will have its value set taking into account the organization's culture, resources, and security ecosystem. For example, "Asset Management" is one of the most difficult building blocks within the capability domain to implement. For a particular organization, for this Asset Management component of the organization's VMS, the "time" element, it will take at least 90 or more days to install, configure and implement an asset management platform. In reference to "impact", asset management is an essential ingredient of a VMS, because the organization needs to identify assets to be able to detect their vulnerabilities. There can be a significant impact of an asset that was undocumented and that was compromised by a threat actor. "Effort" refers to the amount of experience that is required to install, configure, and implement an asset management platform. Although this is not "1—Extremely Difficult", it is "3—Challenging" where advanced experience is required. "Expense" refers to the costs associated with enabling an asset management program, where the organization needs to pay for the platform software and the administrative resources, which would be "1—>$50,000". "Exploitability" is the exploit likelihood of not having an asset management system in place to identify assets for the VMS to scan, which would be "5—Critical Exploit Potential". "Building Block" weight is a unique ingredient, which is used to sequentially order the importance of each building block control within the particular domain. In the case of asset management, the building block score is "5—Initial Requirement (Required to get started)", because a VMS needs to scan inventory to detect vulnerabilities.

In some illustrative embodiments, the TIE^3B model, once assessing and scoring each of the VASCR elements, combines these VASCR elements with the CMMI score generated by the CMMI model to thereby generate a TIE^3B prioritization score. The combining of the scores of these 7 elements may take many different forms depending on the desired implementation. In some illustrative embodiments, the TIE^3B model combines these scores in accordance with the following formulation:

$$\text{TIE}^{3}B \text{ Priority Score} = (\text{Time} \times \text{Impact} \times \text{Effort} \times \text{Expense} \times \text{Exploitability} \times \text{Building Block weight}) \times \text{ABS}(-6 + \text{CMMI}).$$

where Time, Impact, Effort, Expense, Exploitability, and Building Block weight are the VASCR elements having a value from 1 to 5, ABS (–6+CMMI) refers to the absolute value of the sum of the CMMI score and the value –6, and where –6 is used because the scale of the CMMI scores is from 1 to 5. As can be seen from the above formulation, the CMMI score is integrated with the VASCR elements by multiplying the VASCR result with the absolute value (ABS) of the sum between negative 6 and the CMMI score to concentrate on lesser CMMI scores that require a maturity improvement.

As touched upon above, with regard to the VASCR elements, the "Time" element refers to the amount of time required to mature, i.e., move to a more mature classification within a maturity classification scale, the particular control check for the next level of acceptable maturity, e.g., the next level of the CMMI model scoring scale. Here "maturity" refers to a level of advancement of the corresponding component, and the concept of maturing the control check means having the control check assessment result in a more mature rating of the component being checked according to the control check's guidelines and best practices. That is, using a CMMI rating system, cyber maturity is a way to measure industry best practices implemented through a serious of control checks that range from levels 1 to 5, such that (1) is the "Initial" level where the processes that govern the control checks are unpredictable, (2) is "Managed" where the processes that govern the control checks are reactive, (3) is "Defined" where the processes that govern the control checks are proactive, (4) is "Quantitatively Management" where processes that govern the control checks are measured and controlled, and (5) is "Optimizing" where processes that govern the control checks are continuously improved.

The "Time" element is an adjustable score that can be decreased if more time is required using the following example durations that includes, but is not limited to: 5-30 days, 4-60 days, 3-90 days, 2-120 days, 1—>121 days. Thus, the Time element will have a value of "5", for example, if the time required to mature the particular component to the next level of the CMMI model score is 30 days or less, and will have a value of "4" if it is 31 days to 60 days, a value of "3" if it is 61 days to 90 days, a value of "2" if it is 91 days to 120 days, and "1" if it is equal or greater than 121 days.

The "Impact" element refers to how the organization's revenue or credibility could be negatively affected by not having a mature control check securely administered. The "Impact" element is an adjustable score that can be calibrated depending on the impact of not having a mature control check implemented using the following ratings. The following example values and corresponding classifications may be used to evaluate and score the "Impact" element: 1—No organization Impact, 2—Affect Organization, but not Organization Revenue (e.g., No financial loss, but a loss of time to fix the impact), 3—Moderate Internal Organization Impact (e.g., no loss of clients or credibility, but an organization impact in the thousands of dollars), 4 Significant Organization Impact (e.g., Loss of clients and credibility costing the organization millions of dollars, but not bankruptcy), 5—Catastrophic Organization Impact (e.g., Bankruptcy).

The "Effort" element refers to the level of difficulty to implement a security control in the VMS, which may be a maturity improvement in people, process, procedure, and/or technology. The "Effort" element is an adjustable score that can be calibrated depending on the environment type, size, and complexity using the following example ratings: 5—Easy (Basic Information Technology (IT) Skills Are Required), 4—Medium (Proficient Experience is required), 3—Challenging (Advanced Experience is required), 2—Difficult (One Expert is required), 1—Extremely Difficult (Multiple Experts are required).

The "Expense" element refers to the cost of implementing a security control in the VMS to make a significant improvement in people, process, procedure and/or technology. The "Expense" element is an adjustable score that can be calibrated depending on the expense range of the specific security control using the following example ratings: 5—$0 to $1000, 4—$1001 to $10,000, 3—$10,001 to $30,000, 2—$30,001 to $50,000, 1—>$50,000.

The "Exploitability" element refers to the probability of being exploited by not implementing the specific security control in the VMS. The "Exploit" element is an adjustable score that can be calibrated depending on the exploitation probability using the following example ratings: 1—Little to no Exploit Potential, 2—Low Exploit Potential, 3—Medium Exploit Potential, 4—High Exploit Potential, 5—Critical Exploit Potential.

The "Building Block" weight element is a sequential score that is ordered to form a strong foundation for a VMS. In some illustrative embodiments, the "Building Block" weight score is used in conjunction within the eight domains, e.g., capability, scanning, infrastructure, inventory interrogation, structure, vulnerability prioritization, exclusion management, and remediation management, of the IBM Vulnerability Management Risk Assessment Framework that uses the following example ratings: 5—Initial Requirement (Required to get started), 4—Basic (Process/Procedure/Increasing Fidelity), 3—Standard (Optimizing/Adding Modules/Activities), 2—Advanced (Automation and Integration), 1—Expert (Utopia level, in which automated and integrated activities are orchestrated).

As previously discussed above, the CMMI model score has 5 levels of maturity. In accordance with some illustrative embodiments, the CMMI model scoring is performed in accordance with these five maturity levels as follows: 5—Optimizing (Focus on process improvement), 4—Quantitatively Managed (Processes measured and controlled), 3—Defined (Processes characterized for the organization and is proactive), 2—Managed (Processes characterized for projects is often reactive), 1—Initial (Processes unpredictable, poorly controlled, and reactive).

As noted above, the CMMI score is integrated with the VASCR elements by multiplying the "Tie Break" result, i.e., the product of the VASCR element scores, with the absolute value (ABS) of the sum between negative 6 and the CMMI score to concentrate on lesser CMMI scores that need a maturity improvement. For example, the absolute value of the sum of negative 6 and a CMMI of 1 would be 5 and the absolute value of the sum of negative 6 and a CMMI of 2 would be 4. Accordingly, an inverse of the CMMI score is created for the sole purpose to give lesser CMMI scores higher priority to receive maturity improvements. Thus, the "ABS (–6+CMMI)" operates to prioritize lower CMMI scoring components, whereas the VASCR element scoring operates to identify the most critical components of the VMS to prioritize based on their overall effect on the organization with regard to security vulnerability management. As a result, a prioritized ranking, based on the TIE^3B model priority score (combination of VASCR element scores and the ABS (−6+CMMI) value), is generated that specifies which security controls and corresponding components of the VMS should be targeted first according to the "Tie Break (TIE^3B)" model's evaluation of urgency and the lesser CMMI scores that require maturity improvements.

It should be appreciated that the prioritized ranking generated based on the TIE^3B model priority score can distinguish between components and control checks that have the same, or tied, CMMI scores. For example, as will be shown in FIG. 4, and discussed hereafter, while 6 of the component/control check CMMI scores may be 2.0, with the use of the TIE^3B model priority scoring, and the evaluation by the machine learning computer models for evaluating the various VASCR elements used to generate the priority scoring, differentiated priority scores may be generated that distinguishes the same, or tied, CMMI scores by elevating low CMMI scores and taking into account the various VASCR elements. Thus, for example, while Vulnerability Management and Patch Management Program may have a CMMI score of 2.0, they have TieBreak+CMMI priority scores of 10000 and 4000, respectively. This provides a prioritized ranking that "breaks ties" between the same or tied CMMI scores.

The prioritized ranking of the control checks and corresponding components may be output as part of a graphical user interface (GUI) to an authorized user. The GUI provides the authorized user with awareness and recommendations as to security controls that should be the primary focus for improvements to the organizations' VMS. The GUI may provide user feedback elements for the user to manipulate the prioritized ranking and/or provide other user feedback for specifying a correctness or incorrectness of the prioritized ranking. For example, the user may move control checks/components up/down in the prioritized ranked listing to thereby modify the relative prioritization/ranking. This update may be sent back to the machine learning computer models to modify their operational parameters in accordance with a machine learning training algorithm and the loss between the predicted prioritized ranking and the user feedback, using the user feedback as a new ground truth for the machine learning training.

In some instances, the prioritized ranking may be used to automatically initiate improvements to components of the VMS. For example, in the case of patch management, if the patch management component is ranked within a predetermined highest ranking component in the prioritized listing, e.g., top K components, where K is a configurable parameter, then patch download and installment may be automatically initiated. In some illustrative embodiments, during the assessment, the findings, rankings, and recommendations for improvements to components of the VMS may be stored in a database, along with the VASCR elements and CMMI score. A prioritized "Tie Break" score is used to automate the output of a project plan. This automation saves approximately 40 hours or more of sequentially planning out the order of task prerequisites. This project plan can be further broken down by domain to concentrate on specific areas that are in need of improvements or which are keeping the VMS from maturing.

Thus, the illustrative embodiments provide an improved computing tool and improved computing tool operations/functionality that provides dynamic prioritization of vulnerability risk assessment findings. The dynamic nature of the prioritization is realized by the use of the combination of VASCR elements to change the manner of the scoring performed by the CMMI scoring, where these VASCR elements operate as a force or factor that controls or influences the process. That is, the "Tie Break" score influences the CMMI score by integrating the VASCR elements to dynamically prioritize the finding results of control checks into a sequentially ordered project plan.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides system and machine learning computer models to perform dynamic prioritization of vulnerability risk assessment findings. The improved computing tool implements mechanism and functionality, such as the CMMI model and TIE^3B model, which may each comprise one or more trained machine learning computer models, and their corresponding functionality for prioritizing control checks and corresponding components of an organization VMS, which cannot be practically performed by human beings either outside of, or with the assistance of, a technical environment, such as a mental process or the like. The improved computing tool provides a practical application of the methodology at least in that the improved computing tool is able to prioritize the control checks and components of the VMS for the application of resources to perform improvements to mature and improve the VMS.

FIG. 2 is an example diagram of a distributed data processing system environment in which aspects of the illustrative embodiments may be implemented and at least some of the computer code involved in performing the inventive methods may be executed. That is, computing environment 200 contains an example of an environment for the execution of at least some of the computer code involved in performing the inventive methods, such as the dynamic prioritization of vulnerability risk assessment findings system 300 and its corresponding machine learning computer models, such as CMMI model 310 and TIE^3B model 320. In addition to dynamic prioritization of vulnerability risk assessment findings system 300, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and dynamic prioritization of vulnerability risk assessment findings system 300, as identified above), peripheral device set 214 (including user interface (UI), device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in dynamic prioritization of vulnerability risk assessment findings system 300 in persistent storage 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface type operating systems that employ a kernel. The code included in dynamic prioritization of vulnerability risk assessment findings system 300 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

As shown in FIG. 2, one or more of the computing devices, e.g., computer 201 or remote server 204, may be specifically configured to implement a dynamic prioritization of vulnerability risk assessment findings system 300. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 201 or remote server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates dynamic and customized prioritization of control checks and components for application of resources to mature and improve an organization's vulnerability management system (VMS) based on a plurality of elements in addition to the CMMI score.

FIG. 3 is an example block diagram illustrating the primary operational components of a dynamic prioritization of vulnerability risk assessment findings system in accordance with one illustrative embodiment. The operational components shown in FIG. 3 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving the way that prioritization of vulnerability risk assessment findings, e.g., control checks on various components of a vulnerability management system (VMS), is performed and providing a specific solution that implements machine learning computer models to evaluate various elements of an organizations VMS and control checks which cannot be practically performed by human beings as a mental process and is not directed to organizing any human activity.

As shown in FIG. 3, the dynamic prioritization of vulnerability risk assessment findings system 300 (hereafter "the system 300") includes a CMMI model 310 which may comprise one or more machine learning computer models 312-314 which may be trained through machine learning training operations, such as by machine learning training engine 340 based on training dataset(s) 350, to classify control checks and/or components, for various domains of an organization's vulnerability management system, with regard to the CMMI classification scheme, e.g., the 5 levels of maturity of the CMMI model 310. Each trained machine learning computer model 312-314 may operate on the same of different sets of features to perform classification based on those sets of features. If more than one machine learning computer model is utilized, then the classification results may be combined into a single classification of a CMMI maturity level, e.g., 1 to 5, through any suitable combinatorial logic, such as may be provided in an ensemble of machine learning computer models.

The training dataset(s) 350 may comprise data gathered from various data sources 370-372 over time with regard to the various control checks and components of various VMS. The training dataset(s) 350 also include ground truth data specifying correct classifications of the control checks and components, based on the corresponding training data, in accordance with the CMMI model 310 predetermined maturity levels. The training dataset(s) 350 may be curated through automate and/or manual means, with subject matter experts, for example, providing the ground truth classifications for the control checks and components based on their expert review of the corresponding training data.

The training dataset(s) 350 may be used by the machine learning training engine 340 to perform machine learning training on the one or more machine learning computer models 312-314 using a machine learning algorithm, such as linear regression, ridge regression, Lasso regression, logistic regression, or the like. For each machine learning computer model 312-314, the machine learning training iteratively inputs training data, or a set of features extracted from the training data, into the machine learning computer model 312-314 which then processes the input through multiple layers of processing nodes and generates a classification of the input. For example, a vector output may be generated with vector slots each associated with a different classification, e.g., a separate slot for each of maturity levels 1 to 5. A probability value may be generated for each slot based on the processing of the input through the machine learning computer model, with the highest probability value being the final classification. The generated classification is compared to the ground truth to determine an error/loss. The error/loss is processed by the machine learning algorithm of the machine learning training engine 340 to determine a modification to operational parameters, hyperparameters, or the like, of the machine learning computer model 312-314. The modification is applied and the process repeated for a next iteration. This continues until the error/loss is equal to or below a predetermined error/loss (threshold) value, or until a predetermined number of iterations have been executed, at which point the machine learning computer model 312-314 is determined to have converged.

The resulting trained machine learning computer model 312-314 is then tested with a testing dataset, which may be a segmented portion of the training dataset 350, to ensure that the trained machine learning computer model 312-314 is operating appropriately. The trained machine learning computer model 312-314 may then be deployed for runtime operation to process new data obtained from an organization to evaluate their VMS 380 associated with the organization's computing system infrastructure 390.

Similar machine learning training may be performed with regard to the machine learning computer models 322-324 of the TIE^3B model 320, also referred to herein as the TIE Breaker model 320. While the CMMI model 310 comprises one or more trained machine learning computer models trained to classify control checks and components of VMS with regard to the CMMI maturity levels 1 to 5, the TIE^3B model 320 (Tie Breaker) machine learning computer models 322-324 operate to classify control checks and components for various domains of the VMS with regard to the different dimensions of vulnerability assessment security control rating (VASCR) elements, e.g., (1) Time, (2) Impact, (3) Effort, (4) Expense, (5) Exploitability, and (6) Building Block weight. There may be a separate trained machine learning computer model for each of these VASCR elements, with each machine learning computer model classifying input features into a plurality of predetermined classifications for the corresponding VASCR element, e.g., a classification between 1 to 5 for the corresponding VASCR element, as described previously above.

These machine learning computer models 322-324 may be trained by the machine learning training engine 340 based on training dataset(s) 350 in a similar manner as described above with regard to machine learning computer models 312-314 of the CMMI model 310, but with regard to different classifications using different sets of input features and corresponding ground truth data. Thus, there may be different training dataset(s) 350 for the different models

312-314 and 322-324 having different sets of input features and different ground truth data.

It should be appreciated that the machine learning computer models 312-314 and 322-324 may be any suitable machine learning computer model that may be trained through machine learning training processes for specific classification and/or prediction operations. Types of machine learning computer models 322-324 which may be implemented in one or more illustrative embodiments may include neural networks, deep neural networks, recurrent neural networks, random forests, generative adversarial networks, decision trees, K-means clustering models, or any other known or later developed machine learning computer model.

The training dataset(s) 350 may be compiled from one or more data sources 370-372 via one or more data networks, such as wide area network (WAN) 360. These data sources 370-372 may be any suitable electronic system that can provide data pertinent to evaluating VMS control checks and components with regard to the CMMI model 310 and the TIE Breaker model 320. These data sources 370-372 may comprise, for example, computing systems and databases or other data providing systems that provide data structures, electronic documents, and the like, that describe characteristics of control checks, VMS components, and corresponding classifications. For example, these data structures may comprise guideline documents, industry standard documentation, spreadsheets of characteristic values and corresponding CMMI model classifications, spreadsheets of characteristic values and corresponding VASCR element classifications, or the like. In some cases, the control check value data may be gathered from human interviews, and in other cases automated collection mechanisms may be deployed to obtain the control check value data to store in a database, and in still other cases a combination of human interviews and automated collection mechanisms may be utilized. The control check value data may be stored in the database for the particular control and may be automatically associated with scores for each VASCR element, e.g., time, impact, effort, expense, exploitability, and building block weight, such as via a machine learning computer model to generate classifications/predictions of VASCR element scores based on the collected control check value data. These VASCR element scores and CMMI model scores may be used to generate a "Tie Break" score that is utilized by the Tie Break dynamic prioritization mechanisms such that finding and recommendations are generated and output to provide a prioritized sequential project plan.

The system 300 may operate to evaluate the control checks and components of a VMS 380 of an organization, where the VMS 380 operates to perform vulnerability management with regard to the organization's computing system infrastructure 390. Similar to the data sources 370-372, the resulting data, from performing security risk gap assessments which involve applying control checks to the components of the VMS 380, provides data to the system 300 from which sets of features may be extracted and input to the various trained machine learning computer models 312-314 and 322-324 of the CMMI model 310 and the TIE Breaker (TIE^3B) model 320. The CMMI model 310 outputs a CMMI classification or score, e.g., 1 to 5. The TIE Breaker model 320 outputs, for each of the VASCR elements, a corresponding classification or score, again on a commensurate scale of 1 to 5. These scores may be combined, as previously described above, with regard to a predetermined combination function.

The prioritization engine 326 provides logic for combining the various scores from the CMMI model 310 and the TIE Breaker model 320. In some illustrative embodiments, the combination function for combining these scores may be the previously described function of:

$$\text{TIE\textasciicircum{}3}B \text{ Priority Score} = (\text{Time} \times \text{Impact} \times \text{Effort} \times \text{Expense} \times \text{Exploitability} \times \text{Building Block weight}) \times \text{ABS}(-6 + \text{CMMI}).$$

where Time, Impact, Effort, Expense, Exploitability, and Building Block weight are the VASCR elements having a value from 1 to 5, such as may be determined from corresponding ones of the trained machine learning computer models 322-324, ABS (−6+CMMI) refers to the absolute value of the sum of the CMMI score, such as may be generated by the CMMI model 310, and the value −6, and where −6 is used because the scale of the CMMI scores is from 1 to 5. As can be seen from the above formulation, the CMMI score is integrated with the VASCR elements by multiplying the VASCR result with the absolute value (ABS) of the sum between negative 6 and the CMMI score to concentrate on lesser CMMI scores that require a maturity improvement. It should be appreciated that this is only an example of one combination function that may be used in some illustrative embodiments. Other combination functions may be used depending on the desired implementation and the particular scoring scales used for the various VASCR elements and other scoring of the control checks and components. Moreover, the particular function used may be depending upon the fitting of each VASCR element to customize the function to the organization's culture, resources, and security ecosystem.

The prioritization engine 326 generates a TIE Breaker score, or TIE^3B prioritization score, by combining these VASCR element scores generated by the TIE Breaker model 320 with the CMMI score generated by the CMMI model 310 to thereby generate a TIE^3B prioritization score. The TIE Breaker score is then used by the prioritization engine 326 to thereby generate a prioritized ranking and listing of control checks/components of the VMS which may be provided to the GUI and feedback engine 330. The prioritized ranking and listing effectively differentiates control checks and components having the same, or tied, CMMI model scores by taking into account the VASCR elements as differentiating factors. Because the TIE Breaker score takes into account a plurality of VASCR elements as well as the CMMI score, it is less likely that two or more control checks or components will have a similar priority scoring and thus, it is easier to differentiate which control checks and components should be prioritized with regard to maturity improvements over other control checks and components of the organization's VMS.

The GUI and feedback engine 330 receives the prioritized ranking and listing of the control checks and components of the organization's VMS and generates a GUI output that may be provided to an authorized user, such as a user of the VMS 380. The GUI output may present the scoring for the various VASCR elements and the CMMI score for the control checks and components for the various domains, such as shown in FIG. 4 and discussed further hereafter. The GUI may be organized in priority ranking order, may make use of different graphical representations, e.g., colors, highlighting, graphical elements, or the like, to further identify the priorities of the various control checks and components. The GUI may have user interactive components whereby the user can provide feedback as to the correctness of the prioritized ranking or listing presented via the GUI to the user. For example, the user may have user manipulated controls to move entries in the listing up/down in the listing so as to change the relative priority of the entries for the various control checks/components. The user's changes to the priority listing may be provided as feedback to the machine learning training engine 340 which may then operate to update the training of the CMMI model 310 and TIE Breaker model 320, similar to the error/loss used to perform machine learning training of the models. In this way, the models 310-320, and their corresponding models 312-314 and 322-324, may be dynamically updated in response to user feedback.

The GUI provides the authorized user with awareness and recommendations as to security controls and components that should be the primary focus for improvements to the organizations' VMS. In some instances, the prioritized ranking may be used to automatically initiate improvements to components of the VMS. For example, in the case of patch management, if the patch management component is ranked within a predetermined highest ranking component in the prioritized listing, e.g., top K components, where K is a configurable parameter, then patch download and installment may be automatically initiated.

The GUI output generated by the GUI and feedback engine 330, and provided to the authorized user's computing device via the WAN 360, may be used to create maturity roadmaps and sequential project plans. These maturity roadmaps and sequential project plans may be automatically created by dynamically prioritizing vulnerabilities that may have matching or tied initial maturity ratings for control checks.

Thus, the illustrative embodiments provide an improved computer tool and improved computing tool operations/functionality that determines the sequential ordering of security controls with regard to optimizing an organization's vulnerability management system (VMS) to protect the organization's cyber footprint. The improved computing tool operations/functionality can be customized to fit the particular organization's environment, culture, resources, and security ecosystem. By providing a more fine-grained assessment along multiple additional dimensions of maturity, which takes into consideration the specific organization's environment, culture, resources, and security ecosystem with regard to these control checks, organization resources may be directed to the most important gaps in the organization's Vulnerability Management System (VMS) used to assess, identify, and remediate vulnerabilities in the organization's computing infrastructure.

It should be appreciated that while FIG. 3 assumes a machine learning computer model implementation, the illustrative embodiments are not limited to such. In some illustrative embodiments, rather than generating the CMMI model classification or score by using machine learning computer models, user input may be provided, such as a spreadsheet or other data structure, which may be processed by the CMMI model 310, such as by parsing and extracting data from the data structure, to determine the CMMI score from 1 to 5. That is, a subject matter expert may specify, based on their expertise, what the CMMI model maturity level is for the results of applying control checks to components of the VMS when performing security vulnerability gap assessments. Similarly, the data structure, e.g., spreadsheet, may specify values for the various VASCR elements for the different control checks and components. In such a case, the TIE Breaker model 320 may parse and extract these values and process them via the prioritization engine 326 to generate the TIE Breaker scores or TIE^3B prioritization scores which may then be used to generate the prioritized ranking and listing of control checks and components for each domain.

As noted above, the GUI output may include a representation of the various classifications or scores for the various VASCR elements and CMMI model maturity level. FIG. 4 is an example diagram illustrating the evaluation of the various VASCR elements and the generation of the TIE BREAK based priority scoring of control checks/components in accordance with one illustrative embodiment. FIG. 4 is similar to FIG. 1 with regard to columns 410-420 and 435. The other columns 425-430 and 440-470 are additions to the depiction in FIG. 1 that are specific to the illustrative embodiments.

As shown in FIG. 4, similar to FIG. 1, a number of the control building blocks, or components, of the VMS have a same CMMI score 435, e.g., a value of "2.0". The TIE-BREAK column 425 represents the value obtained from the combination of the scores for the VASCR elements generated by the TIE Breaker model 320. That is, in the depicted example, the value in the TIEBREAK column 425 of a row represents the product of the values in columns 440-470 of that row. The TIEBREAK+CMMI column 430 represents the TIE Breaker classification or score, also referred to as TIE^3B priority score, which is the value generated from the combination formula used for the particular implementation, e.g., the above referenced formula:

$$TIE\hat{\ }3B\ Priority\ Score=(Time{\times}Impact{\times}Effort{\times}Expense{\times}Exploitability{\times}Building\ Block\ weight){\times}ABS(-6+CMMI).$$

The values in the columns 440-470 are the values generated by the TIE Breaker model 320 from evaluation of the sets of features extracted from data from the results of the security vulnerability gap assessment and corresponding control checks applied to the components of the VMS 380. In some embodiments, these values are generated by the machine learning computer models 322-324, and in other embodiments, the values may be provided in data structures from subject matter experts associated with the VMS 380.

A similar representation as shown in FIG. 4 may be provided in the GUI output generated by the GUI and feedback engine 330. In the GUI output, the entries, e.g., the rows, may be organized in ascending or descending order of TIE Breaker classification or score. A user may provide input to the GUI to move entries up/down or to modify values in the various columns so as to change the TIE-BREAK+CMMI score and thus, the relative priority ranking in the depicted listing.

Figure 5:
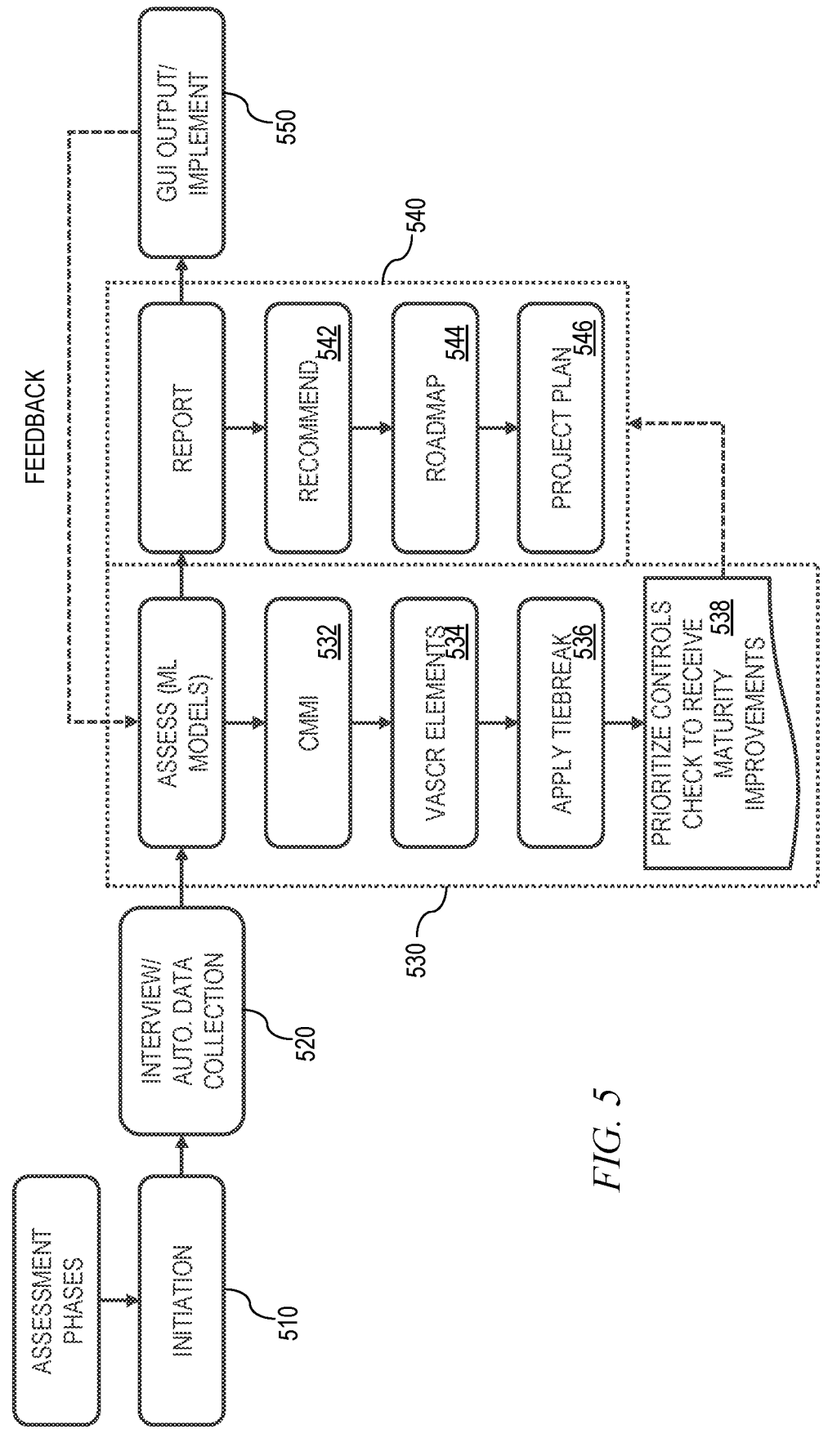
FIG. 5 presents a flowchart outlining example operations of elements of the present invention with regard to one or more illustrative embodiments.

FIG. 5 presents a flowchart outlining example operations of elements of the present invention with regard to one or more illustrative embodiments. It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 5, and may, in some cases, make use of the results generated as a consequence of the operations set forth in FIG. 5, the operations in FIG. 5 themselves are specifically performed by the improved computing tool in an automated manner.

As shown in FIG. 5, the primary operations of the flow comprise operations 510-550, where operations 530 and 540 having sub-operations 532-538 and 542-546, respectively. The operation starts with an initiation phase of operation in which a user initiates evaluation of the VMS with regard to security vulnerability risk gap assessment and prioritization of control checks and components of the VMS (step 510). Data collection is performed based on the results of applying control checks, as part of the security vulnerability risk gap assessment (step 520). This data collection may be performed using automated tools and/or interviewing subject matter experts to provide CMMI scores and/or VASCR element scores for use by the subsequent operations.

Once the data has been collected, the data is assessed by the mechanisms of the illustrative embodiments to prioritize the control checks and components of the VMS with regard to expending resources to perform maturity improvements (step 530). The assessment of operation 530 comprises an evaluation of the CMMI score, such as by the CMMI model 310 in FIG. 3, to generate the CMMI classification/score on the CMMI model scale, e.g., from 1 to 5 (step 532). In addition, the VASCR elements are similarly classified/scores on a similar scale, by the TIE Breaker model 320, to generate a plurality of classifications/scores for each of the VASCR elements, e.g., Time, Impact, Effort, Expense, Exploitability, and Building Block weight (step 534).

Based on the CMMI score and VASCR element scores, the TIE Breaker prioritization logic is applied to generate the TIE^3B prioritization score, or TIE Breaker score (step 536). Based on this prioritization score, the control checks and components are prioritized to receive maturity improvements (step 538). This prioritization is used to inform the reporting operation (step 540) which reports the prioritization, such as by providing a GUI output and generating recommendations (step 542), a maturity roadmap (step 544), and project plan (step 546).

In one illustrative embodiment, each control check may have a series of questions and values that an interviewee may select based on their assessment of the corresponding control check. In some illustrative embodiments, this evaluation may be performed automatically by an automated machine learning computer model that is trained to assess collected data regarding a control check and generate a corresponding evaluation value for that control check. Based on the control check value, the VASCR elements may be automatically assigned to the control check along with the CMMI score. Again, this classification or prediction of a score for each VASCR element may be generated by correlating the values of control checks with VASCR element scores, such as by a trained machine learning computer model trained to perform such classification/prediction based on such data. A "Tie Break" score may be generated based on the VASCR scores and CMMI scores, which will prioritize the findings and recommendations into a sequentially ordered project plan specifying what components of the VMS to mature first, second, third, etc.

The resulting report generation is used to drive the implementation of a GUI output (step 550). Through this GUI output, user feedback may be provided which is then used as input to the assessment models of the assessment operation 530 to update the machine learning training of these assessment models. The operation then terminates.

Thus, the illustrative embodiments provide an improved computing tool and improved computing tool operations/functionality for dynamic prioritization of vulnerability risk assessment findings. The illustrative embodiments provide mechanisms for generating maturity roadmaps and sequential project plans by dynamically prioritizing vulnerabilities that may have matching or tied initial maturity ratings for control checks. The illustrative embodiments provide an improved computer tool and improved computing tool operations/functionality that determines the sequential ordering of security controls with regard to optimizing an organization's vulnerability management system to protect the organization's cyber footprint. The improved computing tool operations/functionality can be customized to fit the particular organization's environment, culture, resources, and security ecosystem. By providing a more fine-grained assessment along multiple additional dimensions of maturity, which takes into consideration the specific organization's environment, culture, resources, and security ecosystem with regard to these control checks, organization resources may be directed to the most important gaps in the organization's Vulnerability Management System (VMS) used to assess, identify, and remediate vulnerabilities in the organization's computing infrastructure.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for assessing control checks and components of a vulnerability management system for a computing system infrastructure, the method comprising:

executing a security vulnerability risk gap assessment of the vulnerability management system (VMS) to generate result data for a plurality of control checks applied during the security vulnerability risk gap assessment;

for each control check in the plurality of control checks:

classifying the control check into one of a plurality of predetermined maturity levels having corresponding maturity level values to generate a maturity level value for the control check;

classifying each of a plurality of vulnerability assessment security control rating (VASCR) elements into one of a plurality of predetermined classifications having corresponding classification values, to thereby generate VASCR element classification values for the control check; and combining the maturity level value and the VASCR element classification values to generate a prioritization score;

generating a graphical user interface output comprising a representation of a prioritized ranked listing of control checks based on the prioritization scores associated with each of the control checks in the plurality of control checks;

providing, via the graphical user interface, user interactive components that enable a user to input a modification to the prioritized ranked listing by rearranging the priority of the control checks;

receiving, from the graphical user interface, user feedback indicative of the prioritized ranked listing;

in response to the user feedback, dynamically recomputing the prioritization scores for the plurality of control checks by reapplying the combining of the maturity level value and the VASCR element classification values to generate updated prioritization scores and updating the graphical user interface output to reflect an updated prioritized ranked listing; and updating operational parameters of one or more assessment models based on the user feedback to make improved prioritizations in future assessments, wherein combining the maturity level value and the VASCR element classification values comprises generating a mathematical product of the VASCR element classification values and multiplying it by an absolute value of the maturity level value combined with a constant value, wherein the constant value is set to prioritize control checks having relatively lower maturity level values.

2. The method of claim 1, wherein the maturity level value for the control check is a Capability Maturity Model Integration value.

3. The method of claim 1, wherein the plurality of VASCR elements comprise at least two of a time element, impact element, effort element, expense element, exploitability element, and building block weight element.

4. The method of claim 1, wherein combining the maturity level value and the VASCR element classification values comprises combining these values in accordance with the following formula:

$$\text{Priority Score} = (\text{Time} \times \text{Impact} \times \text{Effort} \times \text{Expense} \times \text{Exploitability} \times \text{Building Block weight}) \times \text{ABS}(-X + \text{maturity level value})$$

where Time, Impact, Effort, Expense, Exploitability, and Building Block weight are the VASCR element classification values, and ABS (−6+CMMI) refers to the absolute value of the sum of the maturity level value and the constant value −X.

5. The method of claim 4, wherein the Time VASCR element has a value based on an assessment of an amount of time required to mature a corresponding control check to a next level of acceptable maturity.

6. The method of claim 4, wherein the Impact VASCR element has a value based on an assessment of a negative effect on revenue or credibility due to not maturing the corresponding control check.

7. The method of claim 4, wherein the Effort VASCR element has a value based on an assessment of a level of difficulty to implement a security control in the VMS to mature a corresponding control check.

8. The method of claim 4, wherein the Expense VASCR element has a value based on an assessment of a cost of implementing a security control in the VMS to mature a corresponding control check.

9. The method of claim 4, wherein the Exploitability VASCR element has a value based on an assessment of a probability of being exploited by not implementing a security control in the VMS to mature a corresponding control check.

10. The method of claim 4, wherein the Building Block weight VASCR element is a sequential score that is ordered according to foundational level of the corresponding control check.

11. A computer program product comprising a computer readable storage medium having a computer readable program stored therein, wherein the computer readable program, when executed on a computing device, causes the computing device to:

execute a security vulnerability risk gap assessment of the vulnerability management system (VMS) to generate result data for a plurality of control checks applied during the security vulnerability risk gap assessment;

for each control check in the plurality of control checks:

classify the control check into one of a plurality of predetermined maturity levels having corresponding maturity level values to generate a maturity level value for the control check;

classify each of a plurality of vulnerability assessment security control rating (VASCR) elements into one of a plurality of predetermined classifications having corresponding classification values, to thereby generate VASCR element classification values for the control check; and combine the maturity level value and the VASCR element classification values to generate a prioritization score;

generate a graphical user interface output comprising a representation of a prioritized ranked listing of control checks based on the prioritization scores associated with each of the control checks in the plurality of control checks;

provide, via the graphical user interface, user interactive components that enable a user to input a modification to the prioritized ranked listing by rearranging the priority of the control checks;

receive, from the graphical user interface, user feedback indicative of the prioritized ranked listing;

in response to the user feedback, dynamically recompute the prioritization scores for the plurality of control checks by reapplying the combining of the maturity level value and the VASCR element classification values to generate updated prioritization scores and updating the graphical user interface output to reflect an updated prioritized ranked listing; and update operational parameters of one or more assessment models based on the user feedback to make improved prioritizations in future assessments, wherein combining the maturity level value and the VASCR element classification values comprises generating a mathematical product of the VASCR element classification values and multiplying it by an absolute value of the maturity level value combined with a constant value, wherein the constant value is set to prioritize control checks having relatively lower maturity level values.

12. The computer program product of claim 11, wherein combining the maturity level value and the VASCR element classification values comprises combining these values in accordance with the following formula:

$$\text{Priority Score} = (\text{Time} \times \text{Impact} \times \text{Effort} \times \text{Expense} \times \text{Exploitability} \times \text{Building Block weight}) \times \text{ABS}(-X + \text{maturity level value})$$

where Time, Impact, Effort, Expense, Exploitability, and Building Block weight are the VASCR element classification values, and ABS (−6+CMMI) refers to the absolute value of the sum of the maturity level value and the constant value −X.

13. The computer program product of claim 12, wherein the Time VASCR element has a value based on an assessment of an amount of time required to mature a corresponding control check to a next level of acceptable maturity.

14. The computer program product of claim 12, wherein the Impact VASCR element has a value based on an assessment of a negative effect on revenue or credibility due to not maturing the corresponding control check.

15. The computer program product of claim 12, wherein the Effort VASCR element has a value based on an assessment of a level of difficulty to implement a security control in the VMS to mature a corresponding control check.

16. The computer program product of claim 12, wherein the Expense VASCR element has a value based on an assessment of a cost of implementing a security control in the VMS to mature a corresponding control check.

17. The computer program product of claim 12, wherein the Exploitability VASCR element has a value based on an assessment of a probability of being exploited by not implementing a security control in the VMS to mature a corresponding control check.

18. The computer program product of claim 12, wherein the Building Block weight VASCR element is a sequential score that is ordered according to foundational level of the corresponding control check.

19. An apparatus comprising:
at least one processor; and
at least one memory coupled to the at least one processor, wherein the at least one memory comprises instructions which, when executed by the at least one processor, cause the at least one processor to:
execute a security vulnerability risk gap assessment of the vulnerability management system (VMS) to generate result data for a plurality of control checks applied during the security vulnerability risk gap assessment;
for each control check in the plurality of control checks:
classify the control check into one of a plurality of predetermined maturity levels having corresponding maturity level values to generate a maturity level value for the control check;
classify each of a plurality of vulnerability assessment security control rating (VASCR) elements into one of a plurality of predetermined classifications having corresponding classification values, to thereby generate VASCR element classification values for the control check; and
combine the maturity level value and the VASCR element classification values to generate a prioritization score;
generate a graphical user interface output comprising a representation of a prioritized ranked listing of control checks based on the prioritization scores associated with each of the control checks in the plurality of control checks,
provide, via the graphical user interface, user interactive components that enable a user to input a modification to the prioritized ranked listing by rearranging the priority of the control checks;
receive, from the graphical user interface, user feedback indicative of the prioritized ranked listing;
in response to the user feedback, dynamically recompute the prioritization scores for the plurality of control checks by reapplying the combining of the maturity level value and the VASCR element classification values to generate updated prioritization scores and updating the graphical user interface output to reflect an updated prioritized ranked listing; and
update operational parameters of one or more assessment models based on the user feedback to make improved prioritizations in future assessments,
wherein combining the maturity level value and the VASCR element classification values comprises generating a mathematical product of the VASCR element classification values and multiplying it by an absolute value of the maturity level value combined with a constant value, wherein the constant value is set to prioritize control checks having relatively lower maturity level values.

* * * * *